United States Patent
Tomatsuri

(10) Patent No.: US 8,838,310 B2
(45) Date of Patent: Sep. 16, 2014

(54) CONTROL DEVICE FOR HYBRID VEHICLE AND CONTROL METHOD FOR HYBRID VEHICLE

(75) Inventor: Mamoru Tomatsuri, Aichi-gun (JP)

(73) Assignee: Toyota Jidosha Kabushiki Kaisha, Toyota-Shi (JP)

(*) Notice: Subject to any disclaimer, the term of this patent is extended or adjusted under 35 U.S.C. 154(b) by 392 days.

(21) Appl. No.: 13/144,443

(22) PCT Filed: Jan. 14, 2009

(86) PCT No.: PCT/JP2009/050340
§ 371 (c)(1),
(2), (4) Date: Jul. 13, 2011

(87) PCT Pub. No.: WO2010/082312
PCT Pub. Date: Jul. 22, 2010

(65) Prior Publication Data
US 2011/0276213 A1 Nov. 10, 2011

(51) Int. Cl.
*B60W 20/00* (2006.01)
*B60W 10/00* (2006.01)
*B60K 6/365* (2007.10)
*B60K 6/445* (2007.10)
*B60W 10/06* (2006.01)
*B60K 1/02* (2006.01)

(52) U.S. Cl.
CPC ............... *B60W 10/06* (2013.01); *B60W 20/50* (2013.01); *B60K 1/02* (2013.01); *B60W 20/00* (2013.01); *B60K 6/365* (2013.01); *B60K 6/445* (2013.01); *Y02T 10/6239* (2013.01); *Y10S 903/93* (2013.01)

USPC ............ 701/22; 701/101; 701/102; 701/108; 123/568.11; 123/568.14; 123/568.16; 123/568.21; 180/65.21; 180/65.265; 180/65.275; 180/65.28; 180/65.285; 180/65.29; 903/930

(58) Field of Classification Search
USPC ................. 701/22, 101, 102, 108; 123/568.11–568.21; 180/65.21, 180/65.265, 65.275–65.29; 903/930
See application file for complete search history.

(56) References Cited

U.S. PATENT DOCUMENTS 4,212,066 A * 7/1980 Carp et al. .............. 701/103
6,257,214 B1 * 7/2001 Bidner et al. .......... 123/568.16

(Continued)

FOREIGN PATENT DOCUMENTS

JP 62-021724 Y 6/1987
JP 2001-057705 A 2/2001

(Continued)

OTHER PUBLICATIONS

International Search Report mailed Feb. 24, 2009 of PCT/JP2009/050340.

*Primary Examiner* — Jack W Keith
*Assistant Examiner* — Chuong P Nguyen
(74) *Attorney, Agent, or Firm* — Kenyon & Kenyon LLP

(57) ABSTRACT

A control device for a hybrid vehicle causes the hybrid vehicle to travel in limp-home mode with motive power from an engine when either a motor or a battery for travel cannot be used. The engine incorporated in the hybrid vehicle includes an EGR device for recirculating part of exhaust gas to an intake system of the engine again. Even if an operation state of the engine satisfies a prescribed EGR permission condition for operating the EGR device, during the travel in limp-home mode with an abnormality detection flag being set to 1, the control device prohibits operation of the EGR device.

4 Claims, 4 Drawing Sheets

(56) References Cited

U.S. PATENT DOCUMENTS

| | | | |
|---|---|---|---|
| 6,662,790 B1 * | 12/2003 | Kawamura et al. | 123/568.23 |
| 7,100,586 B2 * | 9/2006 | Matsumoto | 123/568.16 |
| 7,117,965 B2 * | 10/2006 | Yatabe et al. | 180/65.235 |
| 7,671,601 B2 * | 3/2010 | Takayama | 324/503 |
| 2003/0106728 A1 * | 6/2003 | Kitajima et al. | 180/65.2 |
| 2007/0095131 A1 * | 5/2007 | Takayama | 73/116 |

FOREIGN PATENT DOCUMENTS

| | | | | |
|---|---|---|---|---|
| JP | 2002/155177 A | * | 5/2002 | B60R 16/02 |
| JP | 2005-121033 A | | 5/2005 | |
| JP | 2007-076551 A | | 3/2007 | |
| JP | 2007076551 A | * | 3/2007 | B60K 6/445 |
| JP | 2007-203883 A | | 8/2007 | |
| WO | 2008/117648 A1 | | 10/2008 | |

* cited by examiner

CONTROL DEVICE FOR HYBRID VEHICLE AND CONTROL METHOD FOR HYBRID VEHICLE

This is a 371 national phase application of PCT/JP2009/050340 filed 14 Jan. 2009, the contents of which are incorporated herein by reference.

TECHNICAL FIELD

The present invention relates to a control device for a hybrid vehicle incorporating an internal combustion engine and a motor generator for travel of the vehicle, and a control method for the hybrid vehicle.

BACKGROUND ART

In recent years, hybrid vehicles that run by efficiently combining an internal combustion engine (engine) and an electric motor (motor) have been put into practical use in view of environmental issues. For example, Japanese Patent Laying-Open No. 2007-76551 (Patent Document 1) discloses an engine including an exhaust gas recirculation (hereinafter referred to as EGR) device for recirculating part of exhaust gas in an exhaust pipe to an intake pipe again, as an engine incorporated in such a hybrid vehicle.

This EGR device recirculates part of exhaust gas exhausted from an engine, and mixes the recirculated gas with a new air-fuel mixture to lower a combustion temperature, thereby suppressing production of nitrogen oxides (NOx) and suppressing pumping loss to improve fuel efficiency.

For further improvement in fuel efficiency of the engine including the EGR device, it has also been studied to increase an amount of the exhaust gas recirculated to the intake pipe (EGR gas), namely, to increase an EGR ratio, which is a ratio of the EGR gas to an amount of intake air introduced into a cylinder. This is because increase in EGR ratio allows combustion with a stoichiometric air-fuel ratio even when fuel and oxygen have low densities, and can suppress increase in an amount of fuel injection for adjusting a temperature of the exhaust gas because combustion heat is absorbed by the exhaust gas in the air-fuel mixture.

Patent Document 1: Japanese Patent Laying-Open No. 2007-76551

DISCLOSURE OF THE INVENTION

Problems to be Solved by the Invention

For such a hybrid vehicle, a technique has been studied to increase a distance traveled in limp-home mode, by traveling in limp-home mode with the motor while stopping the engine when abnormality is detected in an engine control system. For example, Japanese Patent Laying-Open No. 2007-76551 (Patent Document 1) described above discloses a control device for a vehicle for selectively controlling, when a circulation amount control valve of the EGR device is fixed at an open position, an engine to operate with a throttle valve set at an opening position of a prescribed degree or greater including a wide open position, and the engine to stop, in accordance with a required torque.

In contrast, when abnormality is detected in the motor, travel with the use of the motor as a driving source becomes impossible. Accordingly, travel in limp-home mode in which the motor is stopped and motive power from the engine is used is conducted, thereby increasing a distance traveled in limp-home mode.

During this travel in limp-home mode, however, the engine and the motor are coupled to each other via a power split device. Therefore, as the engine is operated, an engine torque is transmitted to a drive shaft to rotate the motor as well. As a result, an induced voltage is generated in a coil winding of the motor, which may cause generation of a short-circuit current in an inverter connected to the motor if the inverter has a short-circuit fault.

In order to prevent such a disadvantage, it is desirable to limit an output from the engine by guarding the opening position of the throttle valve during the travel in limp-home mode. If the EGR device is operated while the engine output is limited, however, an amount of combustible air in the intake pipe is reduced, which causes degradation in a combustion state of the engine. As a result, an engine output enough to keep the travel in limp-home mode cannot be ensured, resulting in difficulty in increasing a travel distance.

Therefore, the present invention was made to solve such problems, and an object of the present invention is to provide a control device for a hybrid vehicle capable of increasing a distance traveled in limp-home mode in traveling in the limp-home mode with motive power from an engine, and a control method for the hybrid vehicle.

Means for Solving the Problems

According to an aspect of the present invention, a control device for a hybrid vehicle for outputting motive power to a drive shaft with an internal combustion engine and a motor generator serving as a driving source is provided, the hybrid vehicle including a first motor generator capable of generating power with the motive power received from the internal combustion engine, a power split device configured to mechanically distribute the motive power from the internal combustion engine between the first motor generator and the drive shaft, a second motor generator having a rotation shaft coupled to the drive shaft, and a power storage device capable of supplying and receiving electric power to and from the first and second motor generators. The internal combustion engine includes an exhaust gas recirculation device for recirculating part of exhaust gas to an intake pipe of the internal combustion engine again through a recirculation valve. The control device includes a during-abnormality travel control unit for causing the hybrid vehicle to travel in limp-home mode with the internal combustion engine serving as a driving source when abnormality of the second motor generator is detected, and a during-abnormality operation limitation unit for limiting operation of the internal combustion engine in accordance with a torque transmitted from the internal combustion engine to the drive shaft when the internal combustion engine operates during travel in the limp-home mode. The during-abnormality operation limitation unit prohibits operation for recirculating the exhaust gas by the exhaust gas recirculation device during travel in the limp-home mode.

Preferably, the during-abnormality travel control unit causes the hybrid vehicle to travel in the limp-home mode with the internal combustion engine serving as a driving source when abnormality of the power storage device is detected. The during-abnormality operation limitation unit limits the operation of the internal combustion engine in accordance with the electric power supplied from the first motor generator to the power storage device when the internal combustion engine operates, and prohibits the operation for recirculating the exhaust gas by the exhaust gas recirculation device, during travel in the limp-home mode.

According to another aspect of the present invention, a control method for a hybrid vehicle for outputting motive power to a drive shaft with an internal combustion engine and a motor generator serving as a driving source is provided, the hybrid vehicle including a first motor generator capable of generating power with the motive power received from the internal combustion engine, a power split device configured to mechanically distribute the motive power from the internal combustion engine between the first motor generator and the drive shaft, a second motor generator having a rotation shaft coupled to the drive shaft, and a power storage device capable of supplying and receiving electric power to and from the first and second motor generators. The internal combustion engine includes an exhaust gas recirculation device for recirculating part of exhaust gas to an intake pipe of the internal combustion engine again through a recirculation valve. The control method includes the steps of causing the hybrid vehicle to travel in limp-home mode with the internal combustion engine serving as a driving source when abnormality of the second motor generator is detected, and limiting operation of the internal combustion engine in accordance with a torque transmitted from the internal combustion engine to the drive shaft when the internal combustion engine operates during travel in the limp-home mode. The step of limiting operation of the internal combustion engine includes prohibiting operation for recirculating the exhaust gas by the exhaust gas recirculation device during travel in the limp-home mode.

Preferably, the step of causing the hybrid vehicle to travel in limp-home mode includes causing the hybrid vehicle to travel in the limp-home mode with the internal combustion engine serving as a driving source when abnormality of the power storage device is detected. The step of limiting operation of the internal combustion engine includes limiting the operation of the internal combustion engine in accordance with the electric power supplied from the first motor generator to the power storage device when the internal combustion engine operates, and prohibiting the operation for recirculating the exhaust gas by the exhaust gas recirculation device, during travel in the limp-home mode.

Effects of the Invention

According to the present invention, when a hybrid vehicle incorporating an engine and a motor travels in limp-home mode with motive power from the engine, a distance traveled in limp-home mode can be increased.

DESCRIPTION OF THE REFERENCE SIGNS

Figure 1:
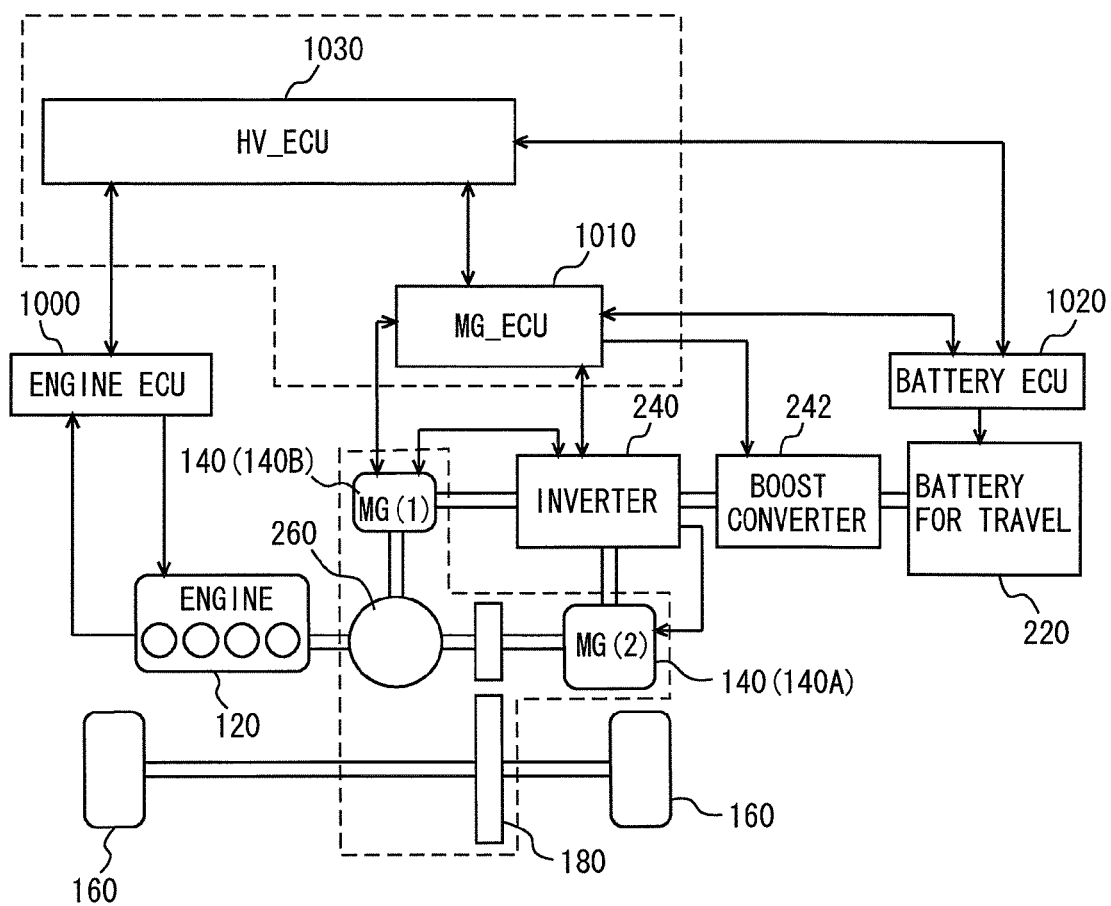
FIG. 1 is a block diagram illustrating a structure of a hybrid vehicle shown as an example of a vehicle incorporating a control device according to an embodiment of the present invention.

102 accelerator position sensor; 120 engine; 140 motor generator; 160 drive wheel; 180 reduction gear; 200 air cleaner; 202 air flow meter; 220 battery for travel; 240 inverter; 242 boost converter; 260 power split device; 300 throttle valve; 302 throttle position sensor; 304 throttle motor; 306 vacuum sensor; 400 fuel tank; 402 fuel pump; 500 EGR pipe; 502 EGR valve; 710, 712 oxygen sensor; 800 high-pressure fuel pump; 804 high-pressure fuel injector; 808 igniter-integrated ignition coil; 900, 902 three-way catalytic converter; 1000 engine ECU; 1020 battery ECU; 1030 HV_ECU.

BEST MODES FOR CARRYING OUT THE INVENTION

An embodiment of the present invention will be described hereinafter in detail with reference to the drawings. It is noted that the same or corresponding elements have the same reference characters allotted in the drawings.

FIG. 1 is a block diagram illustrating a structure of a hybrid vehicle shown as an example of a vehicle incorporating a control device according to the embodiment of the present invention. The present invention is not limited to the hybrid vehicle shown in FIG. 1.

The hybrid vehicle includes, as a driving source, an internal combustion engine (hereinafter simply referred to as an engine) 120 such as a gasoline engine or a diesel engine, and a motor generator (MG) 140. For the sake of explanation, motor generator 140 is expressed as a motor 140A and a generator 140B (or a motor generator 140B) in FIG. 1, however, motor 140A may function as a generator and generator 140B may function as a motor depending on a traveling state of the hybrid vehicle.

The hybrid vehicle additionally includes a reduction gear 180 for transmitting motive power generated at engine 120 and motor generator 140 to drive wheels 160, and transmitting driving force from drive wheels 160 to engine 120 and motor generator 140, a power split device (e.g., a planetary gear mechanism) 260 for distributing motive power generated by engine 120 between two paths to drive wheels 160 and to generator 140B, a battery for travel 220 to which electric power for driving motor generator 140 is charged, an inverter 240 for controlling a current while converting a direct current from battery for travel 220 and an alternating current from motor 140A and generator 140B, a boost converter 242 for converting a voltage between battery for travel 220 and inverter 240, a battery control unit (hereinafter referred to as a battery ECU (Electronic Control Unit)) 1020 for managing and controlling a charge and discharge state of battery for travel 220, an engine ECU 1000 for controlling an operation state of engine 120, an MG_ECU 1010 for controlling motor generator 140, battery ECU 1020, inverter 240 and the like in accordance with a state of the hybrid vehicle, an HV_ECU 1030 for controlling the entire hybrid system to achieve the most efficient operation of the hybrid vehicle by interactively managing and controlling battery ECU 1020, engine ECU 1000, MG_ECU 1010, and the like.

In the embodiment of the present invention shown in FIG. 1, battery ECU 1020, engine ECU 1000, MG_ECU 1010, and HV ECU 1030 correspond to a "control device" in the present invention. Although the ECUs are separately provided in FIG. 1, two or more ECUs may be integrated into an ECU (an example thereof being an ECU having MG_ECU 1010 and HV_ECU 1030 integrated therein, as indicated with a dotted line in FIG. 1).

Power split device 260 employs a planetary gear mechanism (planetary gear) in order to split motive power from engine 120 between drive wheels 160 and motor generator 140B. Power split device 260 also functions as a continuously variable transmission by controlling a speed of motor generator 140B. A torque of engine 120 is input to a planetary carrier (C), and then transmitted to motor generator 140B by a sun gear (S), and to the motor and an output shaft (to drive wheels 160) by a ring gear (R). When rotating engine 120 is stopped, kinetic energy of the rotation of engine 120 is converted to electric energy by motor generator 140B, to reduce a speed of engine 120.

In the hybrid vehicle incorporating the hybrid system as shown in FIG. 1, when engine 120 in low in efficiency such as during startup or low-speed travel, only motor 140A of motor generator 140 is used for travel of the hybrid vehicle, and during normal travel, power split device 260 splits motive power from engine 120 into two paths, for example, to directly drive wheels 160 on one hand and drive generator 140B to generate power on the other hand. Here, the generated electric power drives motor 140A, thereby assisting in driving drive wheels 160. During high-speed travel, electric power from battery for travel 220 is further supplied to motor 140A to increase an output from motor 140A, thereby adding driving force to drive wheels 160. Meanwhile, during deceleration, motor 140A driven by drive wheels 160 functions as a generator and performs regeneration, and electric power collected is stored in battery for travel 220. If battery for travel 220 has a reduced amount of charge and particularly needs to be charged, an output from engine 120 is increased to increase an amount of power generation by generator 140B, thus increasing the amount of charge to battery for travel 220. Of course, even during low-speed travel, control to increase a driving amount of engine 120 is performed as necessary. Examples thereof include such occasions that battery for travel 220 needs to be charged as described above, that auxiliary machinery such as an air conditioner is driven, that a temperature of a coolant for engine 120 is raised to a prescribed temperature, and the like.

Figure 2:
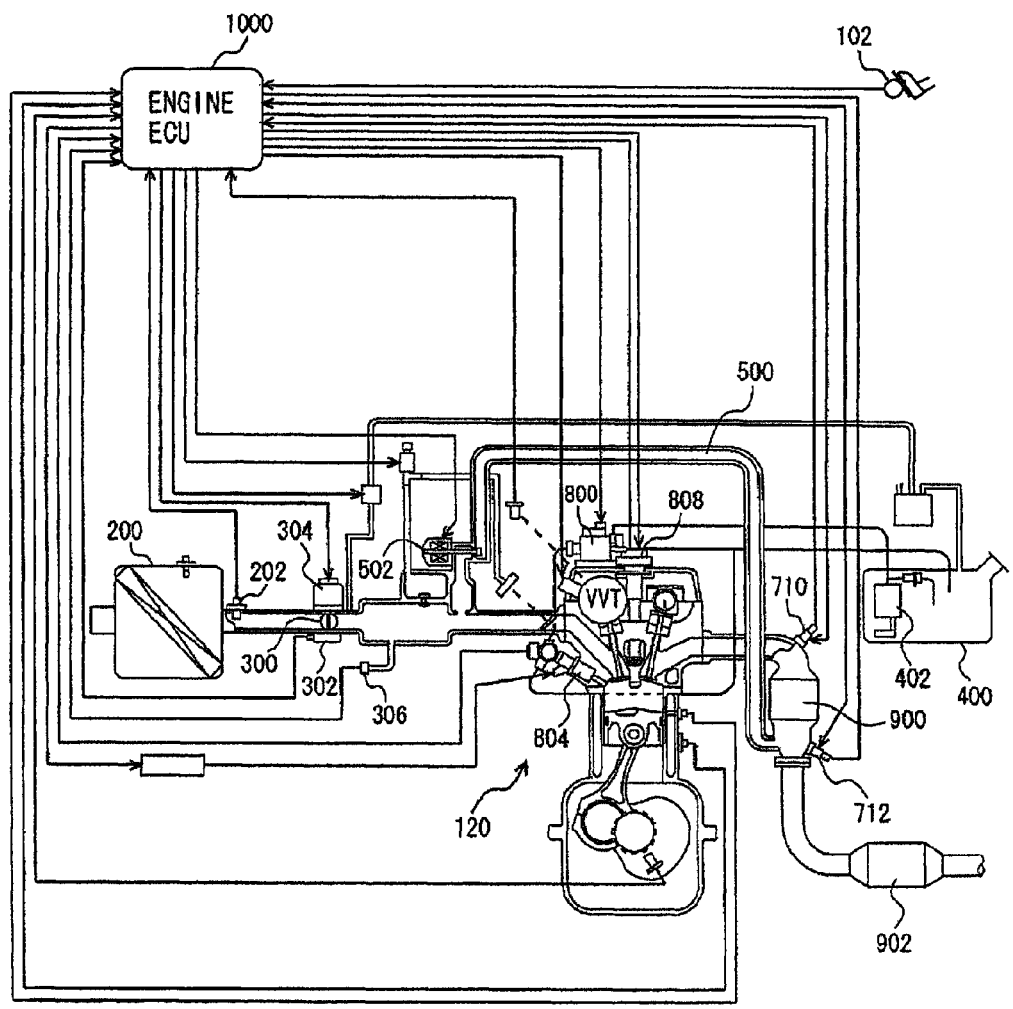
FIG. 2 is a schematic diagram of a structure of an engine system controlled by an engine ECU.

Next, engine 120 controlled by engine ECU 1000 will be described. FIG. 2 is a schematic diagram of a structure of an engine system controlled by engine ECU 1000.

Referring to FIG. 2, in this engine system, air through an air cleaner 200 is introduced into a combustion chamber of engine 120. Here, an amount of intake air is sensed by an air flow meter 202, and a signal indicating the amount of intake air is input to engine ECU 1000. The amount of intake air varies with an opening position of a throttle valve 300. The opening position of this throttle valve 300 is varied by a throttle motor 304 operating in response to a signal from engine ECU 1000. The opening position of throttle valve 300 is sensed by a throttle position sensor 302, and a signal indicating the opening position of throttle valve 300 is input to engine ECU 1000.

Fuel is stored in a fuel tank 400, and injected by a fuel pump 402 via a high-pressure fuel pump 800 from a high-pressure fuel injector 804 to the combustion chamber. An air-fuel mixture of the air introduced from an intake manifold and the fuel injected to the combustion chamber from fuel tank 400 via high-pressure fuel injector 804 is ignited for combustion by using an igniter-integrated ignition coil 808 receiving a control signal from engine ECU 1000. Instead of the structure including an in-cylinder injector for injecting the fuel into a cylinder as shown in FIG. 2, a structure including an intake-pipe injector for injecting the fuel into an intake port and/or the intake pipe, or a structure including both the in-cylinder injector and the intake-pipe injector may alternatively be used.

Exhaust gas resulting from the combustion of the air-fuel mixture passes through an exhaust manifold, a three-way catalytic converter 900, and a three-way catalytic converter 902, and is exhausted to the atmosphere.

This engine system includes an EGR device in which the exhaust gas passes through an EGR pipe 500 from a downstream side of three-way catalytic converter 900 and has its flow rate controlled by an EGR valve 502, as shown in FIG. 2. This EGR device is also called an exhaust gas recirculation device, which recirculates part of the exhaust gas exhausted from engine 120 to an intake system, and mixes the recirculated gas with a new air-fuel mixture to lower a combustion temperature, thereby suppressing production of nitrogen oxides (NOx) and suppressing pumping loss to improve fuel efficiency.

Figure 3:
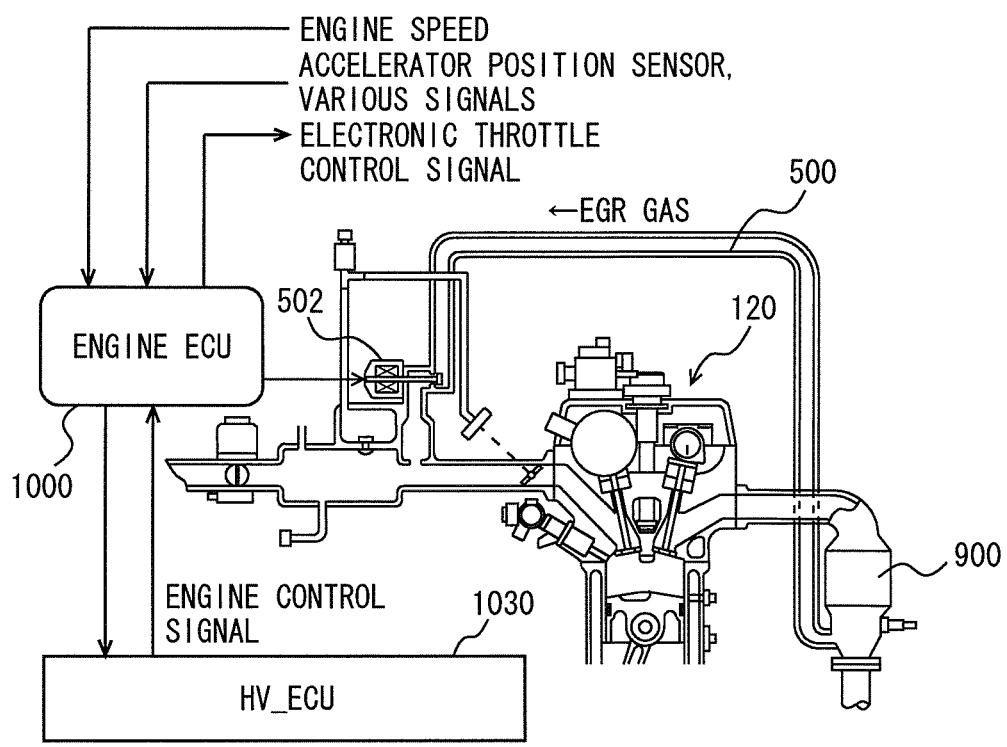
FIG. 3 is an enlarged view of a portion of an EGR device in FIG. 2.

FIG. 3 is an enlarged view of a portion of the EGR device in FIG. 2.

As shown in FIG. 3, as an EGR gas, the exhaust gas that has passed through three-way catalytic converter 900 passes through EGR pipe 500 and is introduced to EGR valve 502. A duty of EGR valve 502 is controlled by engine ECU 1000. Engine ECU 1000 controls an opening position of EGR valve 502 based on the engine speed and various signals such as a signal from an accelerator position sensor 102 (FIG. 2).

Although not shown, EGR valve 502 includes a stepping motor operating in response to a control signal from engine ECU 1000, a poppet valve having a valve opening position linearly controlled by the stepping motor, and a return spring. Since the EGR gas recirculated to the combustion chamber has a high temperature and thus adversely affects performance and durability of EGR valve 502, a coolant passage for cooling with the engine coolant is provided.

HV_ECU 1030 receives a signal indicating the engine speed sensed by an engine speed sensor (not shown), and the signal from accelerator position sensor 102, through engine ECU 1000. HV_ECU 1030 also receives a signal indicating a vehicle speed sensed by a wheel speed sensor (not shown). HV_ECU 1030 outputs an engine control signal (e.g., a throttle opening position signal) to engine ECU 1000 based on these signals.

Engine ECU 1000 outputs an electronic throttle control signal to engine 120 based on the engine control signal and other control signals. Further, engine ECU 1000 generates a control signal for adjusting the opening position of EGR valve 502 based on an operation state of engine 120, and outputs the generated control signal to the stepping motor.

Although it was described that EGR valve 502 in the EGR device has the poppet valve driven by the stepping motor in the present embodiment, the present invention is not limited as such. Instead of an electric actuator such as the stepping motor, a pneumatically controlled EGR valve including a solenoid valve and a pneumatic actuator with a diaphragm may be used, for example.

Referring again to FIG. 2, this engine system includes the following systems in addition to this EGR device.

This engine system includes a fuel injection control system for controlling an amount of fuel injection by detecting an amount of intake air with air flow meter 202 and a vacuum sensor 306. Engine ECU 1000 controls an amount of fuel injection and a timing of fuel injection in accordance with the engine speed and an engine load to achieve an optimal combustion state in response to the signals from the sensors.

In this engine system, the amount of fuel injection is determined based on the engine speed and the amount of intake air (which is detected by vacuum sensor 306 and air flow meter 202). An air-fuel ratio after start is subjected to feedback control by signals from oxygen sensors 710, 712. That is, in the fuel injection control, a timing of fuel injection and an amount of injection are controlled by correcting a basic injection time calculated in accordance with a state of engine 120 based on the signals from the sensors.

Moreover, this engine system includes an ignition timing control system. Engine ECU 1000 calculates an optimal ignition timing based on the signals from the sensors, and outputs an ignition signal to igniter-integrated ignition coil 808. The ignition timing is determined based on an initially set ignition timing or a basic advance angle and a corrective advance angle.

Engine ECU 1000 calculates the ignition timing of engine 120 in accordance with an operation state, based on the signal indicating the engine speed, a signal from a cam position sensor, a signal indicating an intake flow rate, a throttle valve opening position signal, a signal for the engine coolant, and the like, and outputs the ignition signal to igniter-integrated ignition coil 808. That is, in the ignition timing control, an appropriate ignition timing is calculated by correcting a basic injection timing calculated in accordance with a state of engine 120 based on the signals from the sensors.

Furthermore, this engine system includes a throttle control system. This throttle control system controls an opening position of throttle valve 300 calculated in accordance with a state of engine 120 by correcting the same based on the signals from the sensors such that an appropriate opening position is set. That is, engine ECU 1000 controls the opening position of throttle valve 300 by using throttle motor 304 such that an appropriate opening position of throttle valve 300 in accordance with a combustion state of engine 120 is set.

Referring again to FIG. 1, HV_ECU 1030 performs an abnormality diagnosis process of the hybrid system in parallel with the control of the driving force for the vehicle described above. This abnormality diagnosis process is performed based on an operation state of motor generator 140 provided from MG_ECU 1010, a battery state of battery for travel 220 provided from battery ECU 1020, and the like.

If it is determined that motor 140A cannot be used due to abnormality of motor 140A or abnormality of inverter 240 connected to motor 140A, HV_ECU 1030 stops operation of motor 140A, and conducts "travel in limp-home mode" of the hybrid vehicle by a "during-abnormality operation" with motive power from engine 120.

Further, if it is determined that battery for travel 220 cannot be used, HV_ECU 1030 renders a system relay (not shown) provided between battery for travel 220 and boost converter 242 non-conducting, thereby electrically disconnecting battery for travel 220 from the hybrid system. HV_ECU 1030 then conducts the travel in limp-home mode of the hybrid vehicle by the during-abnormality operation with motive power from engine 120 (hereinafter also referred to as "batteryless travel").

Next, a control configuration for conducting the travel in limp-home mode in the hybrid vehicle according to the embodiment of the present invention will be described.

Figure 4:
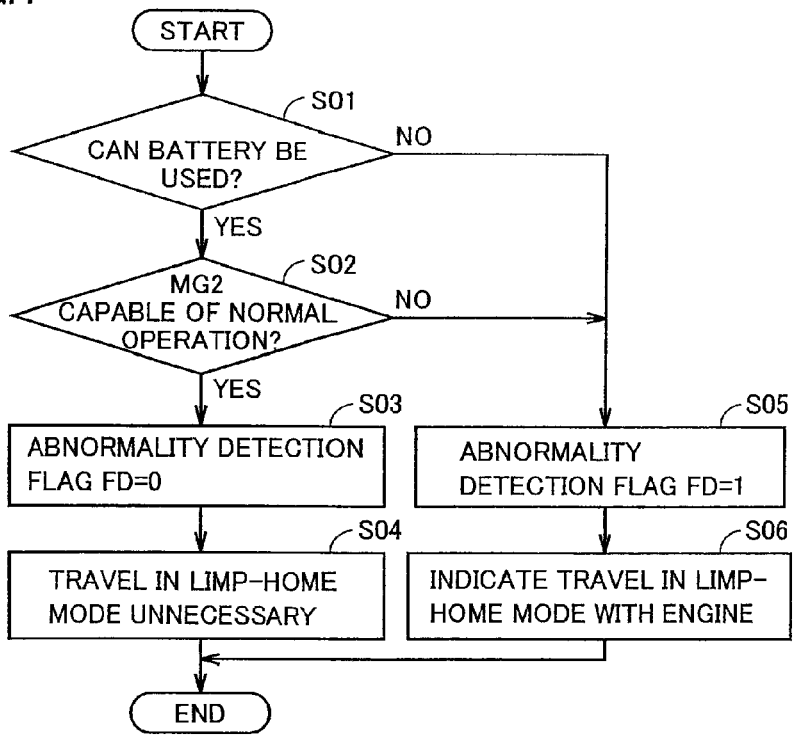
FIG. 4 is a flowchart illustrating operation in limp-home mode in the hybrid vehicle according to the embodiment of the present invention.

FIG. 4 is a flowchart illustrating operation in limp-home mode in the hybrid vehicle according to the embodiment of the present invention. The flowchart shown in FIG. 4 is executed as a series of control processes programmed into HV_ECU 1030 (FIG. 1).

Referring to FIG. 4, HV_ECU 1030 determines whether or not battery for travel 220 can be used (step S01). Battery for travel 220 cannot be used when an SOC of battery for travel 220 is out of a reference range (over discharged or overcharged), for example. Battery for travel 220 cannot be used either, when a temperature of battery for travel 220 exceeds a predetermined allowable temperature.

If battery for travel 220 cannot be used (NO at step S01), HV_ECU 1030 sets an abnormality detection flag FD indicating abnormality of the hybrid system to "1" (step S05). Then, HV_ECU 1030 electrically disconnects battery for travel 220 from the hybrid system by rendering the system relay non-conducting, and indicates the travel in limp-home mode with motive power from engine 120 (step S06).

If battery for travel 220 can be used (YES at step S01), on the other hand, HV_ECU 1030 further determines whether or not motor 140A is capable of normal operation (step S02). Motor 140A is incapable of normal operation when abnormality has occurred in inverter 240 connected to motor 140A, for example. Motor 140A is incapable of normal operation either, even if inverter 240 is operating normally, when a temperature of motor 140A exceeds a predetermined allowable temperature.

If motor 140A is capable of normal operation (YES at step S02), namely, if battery for travel 220 can be used and motor 140A is capable of normal operation, HV_ECU 1030 resets abnormality detection flag FD to "0" (step S03), does not indicate the during-abnormality operation (travel in limp-home mode) (step S04), and completes the control process regarding the travel in limp-home mode.

If motor 140A is incapable of normal operation (NO at step S02), on the other hand, HV_ECU 1030 sets abnormality detection flag FD to "1" (step S05). HV_ECU 1030 then indicates the travel in limp-home mode with motive power from engine 120 (step S06).

With this control configuration, the travel in limp-home mode with motive power from engine 120 is conducted when abnormality is detected in either battery for travel 220 or motor 140A.

During this travel in limp-home mode, however, engine 120 and motor 140A are coupled to each other via power split device 260 (FIG. 1). Therefore, as engine 120 is operated, an engine torque is transmitted to the drive shaft to rotate motor 140A as well. As a result, an induced voltage is generated in a coil winding of motor 140A, which may cause generation of a short-circuit current in the inverter connected to motor 140A if the inverter has a short-circuit fault. Accordingly, if operation of engine 120 is controlled with the control configuration the same as that during normal travel, this short-circuit current is increased and temperatures of components of the inverter become higher than an upper temperature limit thereof, which may result in further damage to elements.

Further, during the batteryless travel, electric power generated at generator 140B with an output received from engine 120 cannot be collected due to the electrical disconnection of battery for travel 220 from the hybrid system.

In order to prevent such disadvantages, therefore, HV_ECU 1030 limits an output from engine 120 during the travel in limp-home mode as compared with during normal travel. More specifically, if motor 140A cannot be used, HV_ECU 1030 limits a required output value and a target speed of engine 120 in accordance with an engine torque transmitted to the drive shaft. HV_ECU 1030 then outputs to engine ECU 1000 an engine control signal (e.g., a throttle opening position signal) generated based on the required output value and the target speed.

If battery for travel 220 cannot be used, HV_ECU 1030 limits the required output value and the target speed of engine 120 in accordance with an amount of power generation at generator 140B, generates an engine control signal based on the required output value and the target speed, and outputs the same to engine ECU 1000.

Engine ECU 1000 outputs an electronic throttle control signal to engine 120 based on the engine control signal and other control signals. As a result, the opening of throttle valve 300 is limited to be smaller than during normal operation.

In the engine system shown in FIG. 2, by operating the EGR device, part of the exhaust gas exhausted from engine 120 is recirculated to the intake system and mixed with a new air-fuel mixture to lower a combustion temperature, thereby suppressing production of NOx to improve fuel efficiency, as described above.

During the travel in limp-home mode, however, an amount of fresh air introduced to an intake pipe is reduced due to the limitation on the opening of the throttle described above. Accordingly, recirculation of the EGR gas to the intake pipe by operating the EGR device causes reduction in an amount of combustible air. Thus, a combustion state of engine 120 becomes unstable and misfire may possibly be caused, which may further reduce an output from engine 120. As a result, travel performance of the hybrid vehicle is lowered, resulting in difficulty in increasing a travel distance during the travel in limp-home mode.

In order to prevent such lowering of travel performance during the travel in limp-home mode, therefore, engine ECU 1000 according to the present embodiment is configured to prohibit operation of the EGR device during the travel in limp-home mode.

Figure 5:
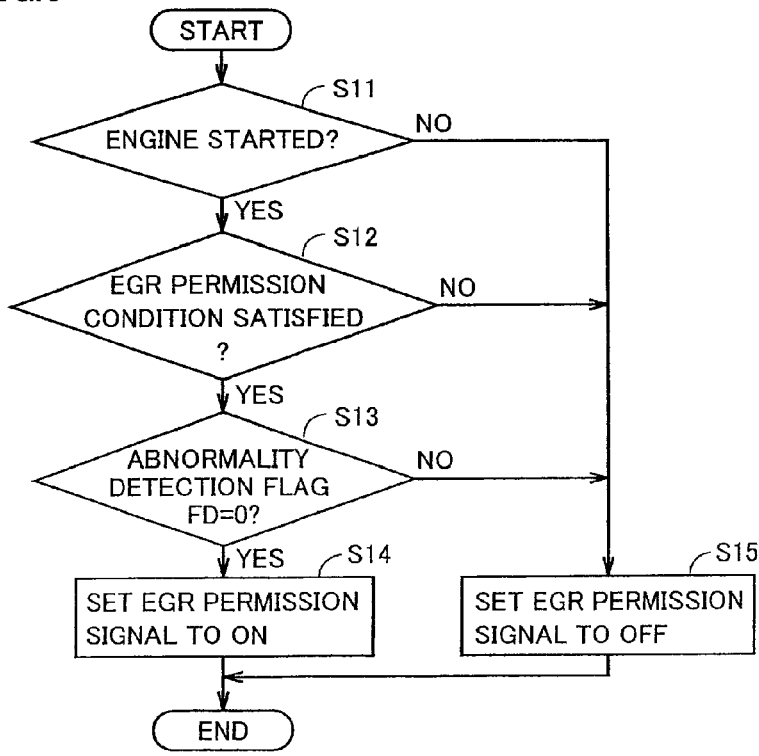
FIG. 5 is a flowchart for illustrating control of the EGR device in the hybrid vehicle according to the embodiment of the present invention.

FIG. 5 is a flowchart for illustrating control of the EGR device in the hybrid vehicle according to the embodiment of the present invention. The flowchart shown in FIG. 5 is executed by engine ECU 1000 when engine 120 is in a stopped state under not-shown engine stop control.

Referring to FIG. 5, upon start of a series of control processes, engine ECU 1000 determines whether or not engine 120 has been started (step S11). Engine 120 is started by engine ECU 1000 in response to an engine start request which is issued when a prescribed engine-stop cancellation condition is satisfied.

If engine 120 has not been started (NO at step S11), engine ECU 1000 sets an EGR permission signal output to the EGR device to OFF (step S15). The EGR device is incapable of operation when this EGR permission signal is set to OFF. The EGR device is capable of operation when the EGR permission signal is set to ON.

If engine 120 has been started (YES at step S11), on the other hand, engine ECU 1000 determines whether or not an operation state of engine 120 satisfies a prescribed condition for operating the EGR device (EGR permission condition) based on data such as the throttle opening position, the amount of intake air, the engine speed, a temperature of the coolant, and the like sensed by the sensors (step S12). If the operation state of engine 120 does not satisfy the EGR permission condition (NO at step S12), engine ECU 1000 sets the EGR permission signal to OFF (step S15).

If the operation state of engine 120 satisfies the EGR permission condition (YES at step S12), on the other hand, engine ECU 1000 further determines whether or not abnormality detection flag FD is set to "0" (step S13). During normal travel with abnormality detection flag FD being set to 0 (YES at step S13), engine ECU 1000 sets the EGR permission signal to ON (step S14). During the travel in limp-home mode with abnormality detection flag FD being set to 1 (NO at step S13), on the other hand, engine ECU 1000 sets the EGR permission signal to OFF (step S15).

As described above, according to the control device for the hybrid vehicle in the embodiment of the present invention, during the travel in limp-home mode of the hybrid vehicle with motive power from the engine, the motive power output from the engine is limited, and operation of the EGR device is prohibited. This allows stable combustion in the engine, thereby preventing reduction in output from the engine. As a result, a travel distance of the vehicle during the travel in limp-home mode can be increased.

In terms of a correspondence between the above embodiment and the present invention, engine 120 corresponds to an "internal combustion engine," motor generator 140 corresponds to "first and second motor generators," and the EGR device corresponds to an "exhaust gas recirculation device." Further, HV_ECU 1030 and the engine ECU implement a "during-abnormality travel control unit" and a "during-abnormality operation limitation unit." Although each functional block forming the control unit was described as functioning as software and being implemented when a CPU (Central Processing Unit) corresponding to the "control device" in the present invention executes a program stored in a storage unit, each functional block may be implemented by hardware. This program is recorded on a recording medium and incorporated into the vehicle.

It should be understood that the embodiments disclosed herein are illustrative and non-restrictive in every respect. The scope of the present invention is defined by the terms of the claims, rather than the description above, and is intended to include any modifications within the scope and meaning equivalent to the terms of the claims.

INDUSTRIAL APPLICABILITY

The present invention is applicable to a control device for a hybrid vehicle incorporating an internal combustion engine and a motor generator for travel of the vehicle.

The invention claimed is:

1. A control device for a hybrid vehicle for outputting motive power to a drive shaft with an internal combustion engine and a motor generator serving as a driving source, said hybrid vehicle including
    a first motor generator capable of generating electric power with the motive power received from said internal combustion engine,
    a power split device configured to mechanically distribute the motive power from said internal combustion engine between said first motor generator and said drive shaft,
    a second motor generator having a rotation shaft coupled to said drive shaft, and
    a power storage device capable of supplying and receiving electric power to and from said first and second motor generators,
    said internal combustion engine including an exhaust gas recirculation device for recirculating part of exhaust gas to an intake pipe of said internal combustion engine again through a recirculation valve,
    said control device comprising:
    a during-abnormality travel control unit programmed to cause said hybrid vehicle to travel in limp-home mode with said internal combustion engine serving as a driving source when abnormality of said second motor generator is detected; and
    a during-abnormality operation limitation unit programmed to limit operation of said internal combustion engine during travel in said limp-home mode,
    said during-abnormality operation limitation unit programmed to prohibit operation for recirculating the exhaust gas by said exhaust gas recirculation device during travel in said limp-home mode.

2. The control device for a hybrid vehicle according to claim 1, wherein
    said during-abnormality travel control unit causes said hybrid vehicle to travel in said limp-home mode with said internal combustion engine serving as a driving source when abnormality of said power storage device is detected, and said during-abnormality operation limitation unit limits the operation of said internal combustion engine in accordance with the electric power supplied from said first motor generator to said power storage device when said internal combustion engine operates, and prohibits the operation for recirculating the exhaust gas by said exhaust gas recirculation device, during travel in said limp-home mode.

3. A control method for a hybrid vehicle for outputting motive power to a drive shaft with an internal combustion engine and a motor generator serving as a driving source, said hybrid vehicle including a first motor generator capable of generating electric power with the motive power received from said internal combustion engine, a power split device configured to mechanically distribute the motive power from said internal combustion engine between said first motor generator and said drive shaft, a second motor generator having a rotation shaft coupled to said drive shaft, and a power storage device capable of supplying and receiving electric power to and from said first and second motor generators, said internal combustion engine including an exhaust gas recirculation device for recirculating part of exhaust gas to an intake pipe of said internal combustion engine again through a recirculation valve, said control method comprising the steps of:

causing said hybrid vehicle to travel in limp-home mode with said internal combustion engine serving as a driving source when abnormality of said second motor generator is detected; and limiting operation of said internal combustion engine in accordance with a torque transmitted from said internal combustion engine to said drive shaft when said internal combustion engine operates during travel in said limp-home mode, said step of limiting operation of said internal combustion engine including prohibiting operation for recirculating the exhaust gas by said exhaust gas recirculation device during travel in said limp-home mode.

4. The control method for a hybrid vehicle according to claim 3, wherein said step of causing said hybrid vehicle to travel in limp-home mode includes causing said hybrid vehicle to travel in said limp-home mode with said internal combustion engine serving as a driving source when abnormality of said power storage device is detected, and said step of limiting operation of said internal combustion engine includes limiting the operation of said internal combustion engine in accordance with the electric power supplied from said first motor generator to said power storage device when said internal combustion engine operates, and prohibiting the operation for recirculating the exhaust gas by said exhaust gas recirculation device, during travel in said limp-home mode.

* * * * *